J. F. SHUFORD.
COMBINATION TRUCK AND MOVABLE PLATFORM.
APPLICATION FILED JULY 23, 1917.

1,261,633.

Patented Apr. 2, 1918.
2 SHEETS—SHEET 1.

Inventor
JACOB FRANKLIN SHUFORD
BY Hazard & Miller
Attys

J. F. SHUFORD.
COMBINATION TRUCK AND MOVABLE PLATFORM.
APPLICATION FILED JULY 23, 1917.
1,261,633.
Patented Apr. 2, 1918.
2 SHEETS—SHEET 2.
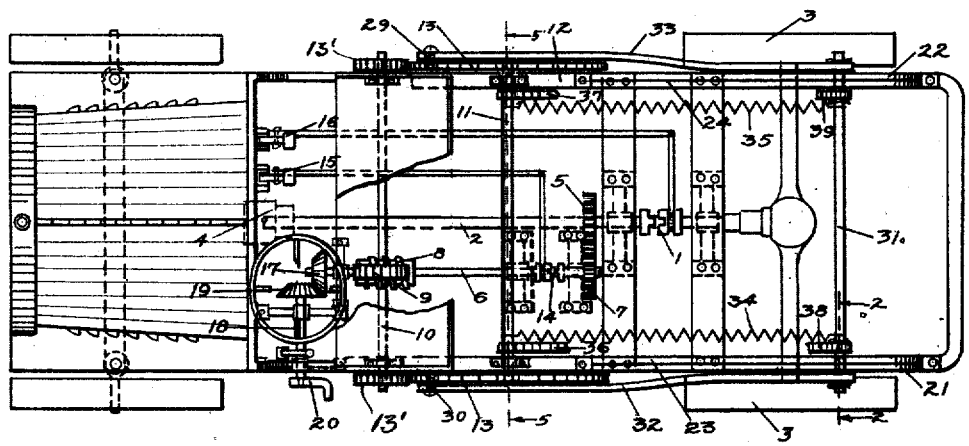
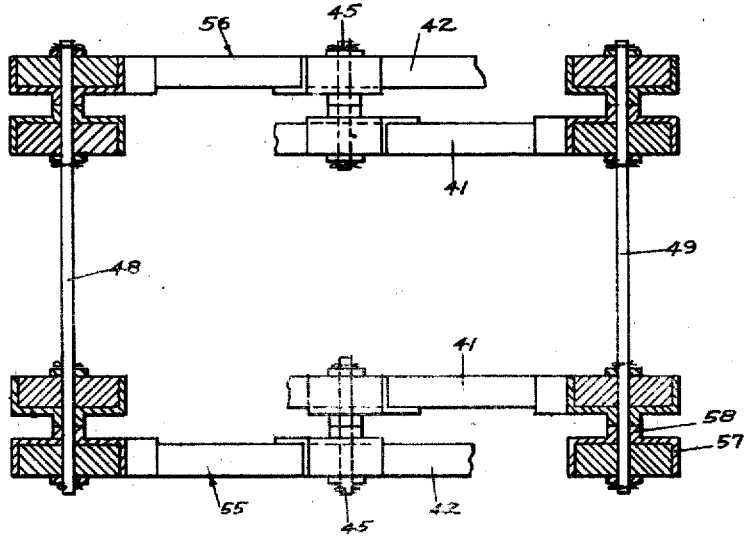
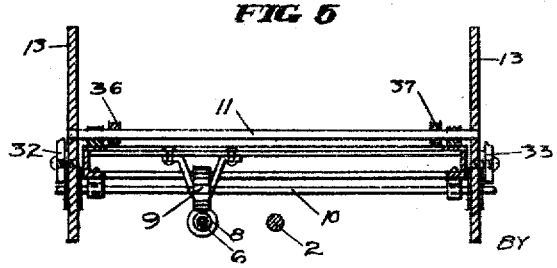
Inventor
JACOB FRANKLIN SHUFORD
BY Hazard & Miller
Attys.

UNITED STATES PATENT OFFICE.

JACOB FRANK SHUFORD, OF LOS ANGELES, CALIFORNIA.

COMBINATION TRUCK AND MOVABLE PLATFORM.

1,261,633.   Specification of Letters Patent.   Patented Apr. 2, 1918.

Application filed July 23, 1917. Serial No. 182,336.

*To all whom it may concern:*

Be it known that I, JACOB FRANKLIN SHUFORD, a citizen of the United States, residing at Los Angeles, in the county of Los Angeles and State of California, have invented new and useful Improvements in Combination Trucks and Movable Platforms, of which the following is a specification.

My object is to make a portable telescoping or disappearing tower platform for general purposes.

An object of my invention is to provide a platform for the use of workmen in repairing trolley wires and the like, mount the platform upon a suitable carriage for transportation, and provide simple means of raising and lowering the platform.

Another object of my invention is to mount a lineman's platform upon an automobile truck so that the platform may be raised and lowered by the operation of the power plant of the truck.

Another object of my invention is to provide a lineman's platform which may be mounted upon a wagon or other suitable carriage and provide means for raising and lowering the platform manually.

Fig. 3 is a conventional plan of the truck shown in Fig. 1, with the tower and platform broken away.

Fig. 4 is an enlarged horizontal cross-sectional detail through the lazy-tong tower, as on the line 4—4 of Fig. 1.

Fig. 5 is a vertical cross-section on the lines 5—5 of Figs. 1 and 3.

Figures 1, 2:
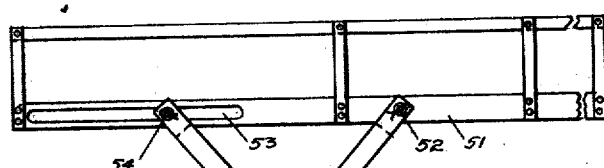
Figure 1 is a side elevation of a combined automobile truck and platform constructed in accordance with the principles of my invention and showing the platform elevated and ready for use.
Fig. 2 is an enlarged vertical cross-sectional detail on the lines 2—2 of Figs. 1 and 3.

When the lazy-tong tower and platform is to be mounted on an automobile truck and operated from the power-plant of the truck, as shown in Figs. 1 and 3, the power-plant of the truck is of the usual construction except that the clutch mechanism 1 is incorporated with the shaft 2 which drives the rear wheels 3 of the truck from the transmission gear 4 of the engine, the object being to disconnect the rear wheels so that the rig will stand still upon the ground while the tower is being operated. A gear 5 is fixed upon the shaft 2. A counter-shaft 6 is mounted parallel with the shaft 2 and carries a gear 7 meshing with the gear 5. A worm-pinion 8 is fixed upon the shaft 6 and drives a worm gear 9 fixed upon the countershaft 10. The tower operating shaft 11 is mounted transversely of the frame 12 and carries large gears 13 upon each end which meshes with the gears 13' upon the countershaft 10. The gear 7 is connected to the shaft 6 through a clutch 14, and the clutch 14 is operated from a pedal or lever 15 so that when the engine is running the clutch 1 may be disconnected and the clutch 14 connected, and the shaft 11 will be rotated from the power plant. The clutch 1 is operated from a pedal or lever 16.

If it is desired to operate the tower and platform manually, a bevel gear 17 may be fixed upon the shaft 6, a crank-shaft 18 mounted transversely of the rig with a bevel gear 19 meshing with the bevel gear 17, and a crank 20 upon its outer end for manual operation.

The side bars of the automobile truck frame are formed of channel-irons 21 and 22. Guide bars 23 and 24 are mounted above the channel-irons 21 and 22 and parallel therewith to form guide-ways 25. The shaft 11 is mounted in bearings near the forward ends of the guide-bars 23 and 24. Wrist-pins 29 and 30 are fixed to the gears 13 and extend outwardly. A shaft 31 extends cross-wise of the frame and slides in the guide-ways 25. Pitmen or connecting rods 32 and 33 connect the wrist-pins 29 and 30 to the outer ends of the shaft 31 so that as the shaft 11 rotates the shaft 31 slides forwardly and backwardly in the guide-ways 25. Counterbalancing springs 34 and 35 connect the shaft 31 to the forward part of the frame. Lazy-tong levers 36 and 37 are pivotally connected at their lower ends to shaft 11, and complementary lazy-tong levers 38 and 39 are pivotally mounted upon the shaft 31, the levers 36 and 38 crossing at their centers and pivot pins 40 are inserted through the centers to connect the levers together. The levers 37 and 39 are correspondingly crossed and connected. A second set of lazy-tong levers 41 and 42 are connected to the upper ends of the levers 36 and 38 by pivots 43 and 44, and are connected together by a pivot 45. A third set of lazy-tong levers 46 and 47 are connected to the upper ends of the levers 41 and 42 by pivots 48 and 49 and connected at their centers by a pivot 50. The levers 37 and 39 have corresponding second and third sets. The platform 51 is pivotally connected to the upper ends of the levers 46 by pivots 52, and the side bars of the platform have longitudinally extending slots 53, and pivots 54 are inserted through the upper ends of the levers 47 and slide in these slots 53. The platform 51 may be of any suitable construction adapted for the use of workmen in repairing trolley lines and the like, and the lazy-tong levers may be of any desired length to produce a telescoping tower of any desired height.

When the shaft 11 is rotated to bring the wrist-pins 29 and 30 into horizontal alinement in front of the shaft, the tower is extended and the platform elevated to its extreme height, and when the shaft 11 is rotated to bring the wrist-pins into horizontal alinement behind the shaft, the tower is completely collapsed and the platform lowered.

There are two sets of lazy-tong constructions, 55 and 56, the complete construction of the lazy-tong construction 55 being shown in Fig. 1, and the complementary construction 56 is shown in horizontal section in Fig. 4. The pivots 43, 44, 48 and 49 extend clear across the rig and connect the two sets of lazy-tongs together. Each lazy-tong consists of two lines of levers, the lower end of one line being pivotally connected at the forward end of the base or supporting frame and the upper end of the same line being pivotally connected to the platform. The lower end of the other line is slidingly connected to the base and the upper end is slidingly connected to the platform. By this arrangement the platform goes straight up and down from the base.

The bodies of the lazy-tong levers may be constructed of wood, and bearing plates 57 are fixed upon the levers at the points where the pivots go through the levers, so as to reinforce the wood and make metal bearings for the pivots. The bearing plates are channel-shaped in cross-section to fit against one side and two edges of the wooden levers and have hubs 58 at the centers to form bearings for the pivots, and the levers are arranged so that the hubs butt together, thereby spacing the levers apart.

It is obvious that my portable telescoping tower platform may be used for many purposes, such as mounting army machine guns, in building or repairing bridges, working on tall signals, setting up camp tents, making moving pictures, doing police and fire department work, repairing electric wires, picking fruit, transporting prison guards and lookouts, handling circus tents, doing ambulance work, handling search lights, and the like.

The details of construction may be varied in many ways without departing from the spirit of my invention as set up in the following claims:

I claim:

1. An automobile truck having an engine at its front end and a drive shaft extending from the engine to the rear end for driving the rear wheels, means for connecting and disconnecting the drive shaft from the rear wheels, a lazy-tong tower mounted upon the frame of the truck to go up and down, a platform mounted upon the tower; one line of the lazy-tongs being pivotally connected to the frame and the other line of lazy-tongs being connected to slide longitudinally of the frame and connected to pitmen; said pitmen being connected to wrist-pins; gears carrying the wrist-pins, a shaft mounted in the frame and carrying the gears, a counter-shaft mounted in the frame, gears fixed upon the counter-shaft and meshing with the gears carrying the wrist-pins, a second counter-shaft parallel with the drive shaft and connected to the first counter-shaft by a worm and gear and connected to the drive shaft by spur gears, and a clutch mechanism for connecting and disconnecting the second counter-shaft to and from the drive shaft so that the drive shaft may be disconnected from the rear wheels, the second counter-shaft connected to the drive shaft, and the tower raised, sustained, and lowered by the operation of the engine.

2. An automobile truck having an engine at its forward end and a differential driving axle at its rear end and a drive shaft connecting the engine to the differential driving axle through a clutch, a lazy-tong tower mounted upon the truck, a shaft mounted transversely of the truck, gears upon the ends of the shaft, pitmen connecting the gears to one line of the lazy-tongs, a counter-shaft mounted transversely of the truck, gears connecting the counter-shaft to the first shaft, a second counter-shaft mounted parallel with the drive shaft, a worm and gear connecting the second counter-shaft to the first counter-shaft, spur gears connecting the drive shaft to the second counter-shaft, and a clutch in the line between the drive shaft and the tower; so that the drive shaft may be disconnected from the differential driving axle and connected to operate the tower.

In testimony whereof I have signed my name to this specification.

J. FRANK SHUFORD.